United States Patent [19]

Lucey

[11] Patent Number: 5,723,046

[45] Date of Patent: Mar. 3, 1998

[54] DRIP TRAY LOCK MECHANISM FOR FILTER PRESS

[75] Inventor: David Lucey, Holland, Mich.

[73] Assignee: JWI, Inc., Holland, Mich.

[21] Appl. No.: 522,191

[22] Filed: Aug. 31, 1995

[51] Int. Cl.$^6$ ................................................ B01D 25/12
[52] U.S. Cl. ...................................... 210/230; 210/248
[58] Field of Search ................................ 210/224, 248, 210/230, 225; 100/131, 197

[56] References Cited

U.S. PATENT DOCUMENTS

| | | | |
|---|---|---|---|
| 4,337,695 | 7/1982 | Clendaniel | 100/195 |
| 5,275,097 | 1/1994 | Wettlaufer | 100/131 |

FOREIGN PATENT DOCUMENTS 1238309  10/1986  Japan ................................. 210/224

*Primary Examiner*—Matthew O. Savage
*Attorney, Agent, or Firm*—Flynn, Thiel, Boutell & Tanis, P.C.

[57] ABSTRACT

A filter press having an activating mechanism for holding the drip trays in a closed position before the stack of filter plates. The activating mechanism includes a fluid pressure cylinder which moves the drip trays between open and closed positions. The activating mechanism includes a linkage which moves into a locking position when the pressurized cylinder moves the trays into the closed position to automatically maintain the drip trays in the closed position even though pressure to the activating cylinder is relieved.

6 Claims, 3 Drawing Sheets

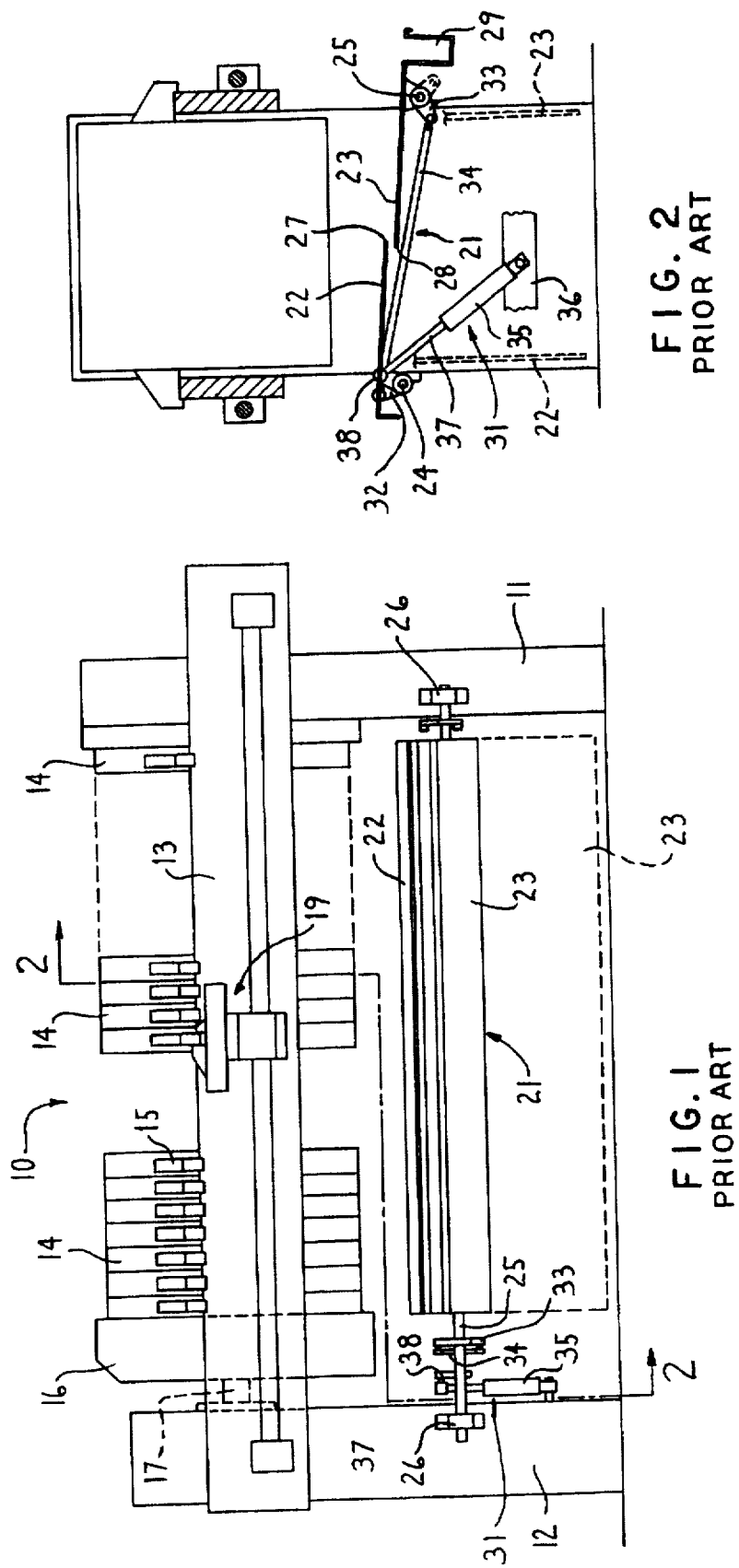

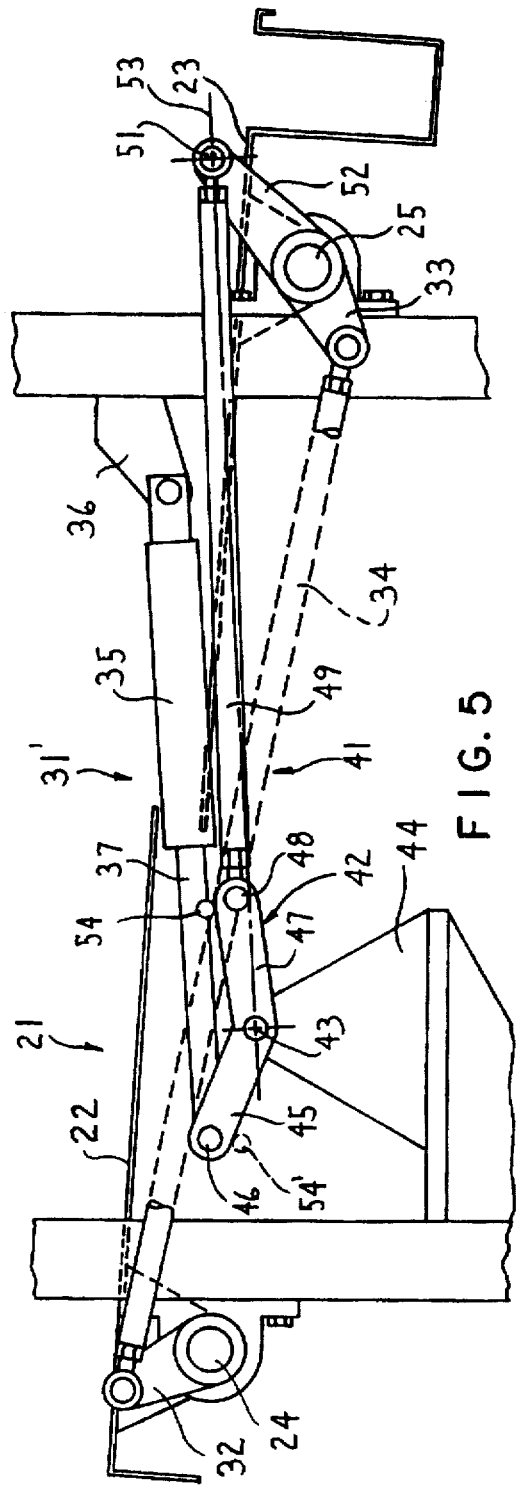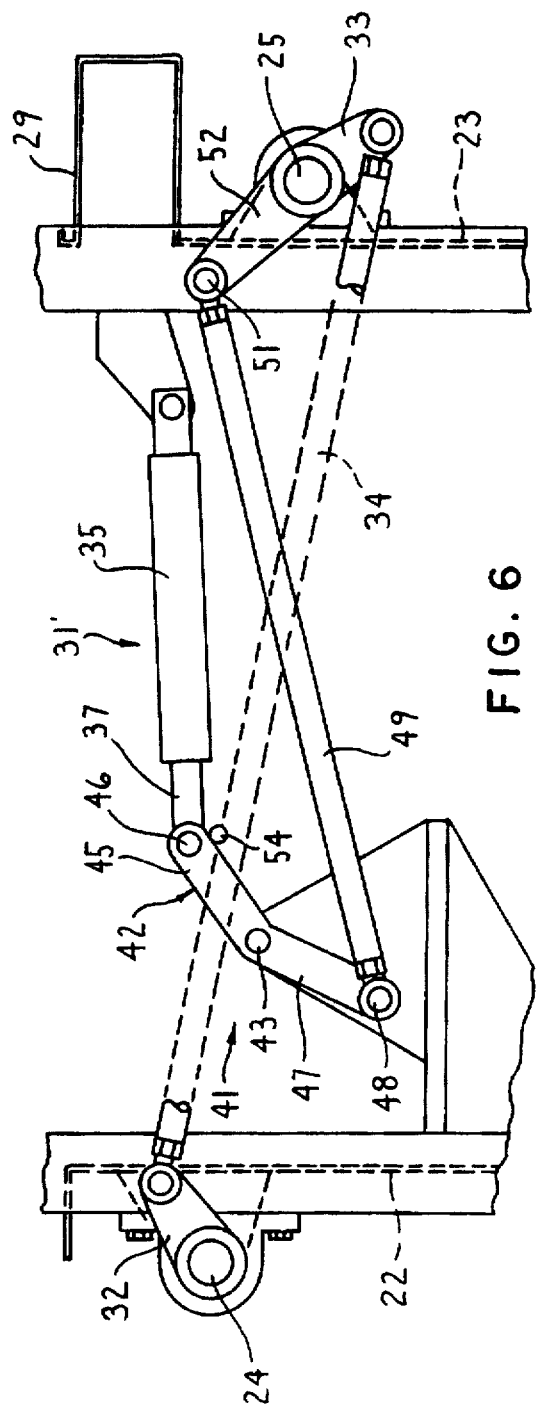

DRIP TRAY LOCK MECHANISM FOR FILTER PRESS

FIELD OF THE INVENTION

This invention relates to a plate-type filter press having openable drip trays swingably positioned under the closed plate stack for collecting liquid leakage from the stack and, in particular, to an improved fluid-pressure activating mechanism to securely hold and effectively lock the drip trays in the closed position to prevent accidental opening thereof due to pressure loss in the activating pressure cylinder.

BACKGROUND OF THE INVENTION

During the filtration cycle of a plate-type filter press, wherein the individual plates are horizontally pressed together into a stack and are supplied with a slurry so as to effect separation of solids from the liquid, leakage of liquid from between the stack of plates is typically encountered. To control and gather the liquid which leaks from the stack, the filter press is normally provided with one and more typically two drip trays which are positionable in a generally horizontally closed orientation below the stack to collect the liquid thereon and feed it to an appropriate collection point. The drip trays are conventionally a pair of generally horizontally enlarged plate-like tray members which are individually supported adjacent opposite sides of the filter press and are positionable in a downwardly vertically suspended open position when opening of the stack and dumping of the solids is desired. These individual drip trays are then vertically swingable inwardly and upwardly in opposed relation to a closed position wherein they extend approximately horizontally and typically having edge portions which generally overlap to collect the liquid leakage thereon and supply the leakage to a collection trough which is generally formed along an edge of one drip tray. To effect the desired opening and closing of the drip trays, a mechanism employing a hydraulic pressure cylinder is typically supplied, and such mechanism generally requires that the hydraulic fluid be continuously supplied to the pressure cylinder to maintain it in a pressurized state when the drip trays are in the closed position. It has been observed, however, inasmuch as the filter press may remain in a closed position for a long period of time, that hydraulic pressure tends to leak down and hence the pressure in the cylinder holding the drip trays closed can likewise leak down. When this occurs, the weight of the trays acting through the connecting linkage back onto the cylinder causes retraction of the cylinder, and hence allows at least partial and undesired opening of the drip trays, whereby they hence are no longer disposed so as to provide the desired liquid-collecting function.

It is thus an object of this invention to provide an improved activating mechanism for the drip trays of a plate-type filter press, which activating mechanism effectively causes a self-locking of the drip trays in the closed position, and thereby overcomes the disadvantage associated with prior presses as briefly described above.

More specifically, in the filter press of the present invention incorporating therein an improved activating mechanism for the drip trays, the activating mechanism again includes a fluid pressure cylinder which moves the drip trays between open and closed positions. The activating mechanism, however, includes a linkage which effectively moves into a locking position when the pressurized cylinder moves the trays into the closed position, whereby this locking of the mechanism effectively automatically maintains the drip trays in the closed position even though the pressure to the activating cylinder is relieved. In the preferred embodiment, the activating mechanism involves an over-center mechanism and specifically a lever mechanism which moves past an over-center position just prior to the drip trays being pivotally moved into their closed position. Thereafter the pressure to the activating cylinder can be relieved, and the weight of the drip trays acting through the mechanism back on the over-center lever mechanism is such as to always urge the latter against a suitable stop, whereby the weight of the trays themselves hence automatically maintain the activating mechanism and the trays in the closed position, with the trays being movable back to the open position only when the activating cylinder is repressurized in a reverse direction.

In addition to the advantages associated with the filter press and the improved activating mechanism described above, this improved activating mechanism is mechanically simple and reliable in operation, and inexpensive to construct, install and maintain.

Other objects and purposes of the invention will be apparent to persons familiar with systems of this general type upon reading the following specification and inspecting the accompanying drawings.

BRIEF DESCRIPTION OF THE DRAWINGS

FIG. 1 is a side elevational view of a prior art filter press employing drip trays and a conventional activating mechanism therefor;

FIG. 2 is an elevational view taken generally along line 2—2 in FIG. 1 and showing a prior art drip tray arrangement and an activating mechanism therefor;

FIGS. 5 and 6 are fragmentary end elevational views which respectively correspond to FIGS. 3 and 4 and show the drip tray and activating mechanism of the present invention respectively in the closed and open positions.

Figure 3:
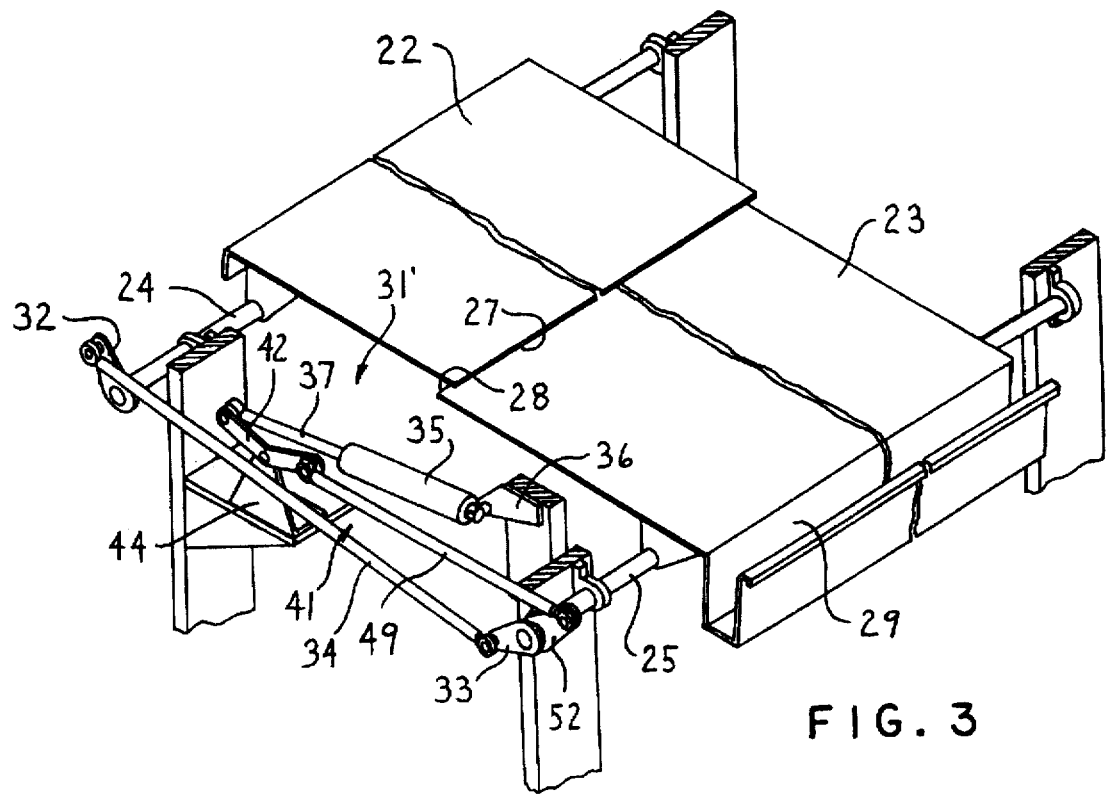
FIGS. 3 and 4 are fragmentary prospective views which respectively show the drip tray arrangement in the closed and open positions, and additionally show the improved activating mechanism of the present invention associated therewith.

Certain terminology will be used in the following description for convenience in reference only, and will not be limiting. For example, the words "upwardly", "downwardly", "rightwardly", and "leftwardly" will refer to directions in the drawings to which reference is made. The words "inwardly" and "outwardly" will refer to directions toward and away from, respectively, the geometric center of the press and designated parts thereof. Said terminology will include the words specifically mentioned, derivatives thereof, and words of similar import.

DETAIL DESCRIPTION

FIGS. 1 and 2 illustrate therein a somewhat conventional filter press 10 having a pair of end supports 11 and 12 rigidly joined together by a pair of generally parallel and horizontally elongate rails 13, which rails and end supports hence define a generally rigid frame. The rails 13 are sidewardly spaced apart, and a plurality of conventional vertically-enlarged filter plates 14 are suspendingly supported therebetween. Each filter plate 14, in a generally conventional manner, has a pair of support arms 15 which project outwardly from opposite sides of the filter plate so as to slidably support the respective filter plate for horizontal longitudinal movement along the rails 13.

The filter press 10 also has a movable follower or headplate arrangement 16 which is disposed adjacent one end of the press frame and is supported for movement along the side rails 13. This follower or head 16 is displaceable horizontally along the rails by a conventional driving device 17, such as a conventional fluid pressure cylinder. The follower or head 16 and the opposed end support 11, which in effect defines a stationary pressure head, cooperate to confine the plurality of filter plates 14 therebetween, which plates are disposed in a generally horizontally stacked relationship.

As is conventional, under normal operation, the driving device 17 is activated to move the head 16 rightwardly in FIG. 1 so that the stack of filter plates 14 are snugly and tightly held between the opposed heads 11 and 16. These opposed heads have suitable conduits (not shown) connected therethrough for communication with the interior of the stack of filter plates. A slurry is supplied through one of the heads into the stack of filter plates, and the cleaned liquid flows outwardly through the head at the other end, whereupon the solids collect on the filters which extend across the frames defining the filter plates 14.

To permit removal or dumping of the solids which collect on the filter plates, the movable head 16 is moved into the open position substantially as illustrated by FIG. 1, and the plates 14 are then individually moved leftwardly away from the stack toward the head 16 to permit solids to dump downwardly for deposit into a suitable collecting bin. To effect this sequential and individual opening movement of the filter plates 14, the filter press has a plate shifting mechanism 19 which typically moves longitudinally along opposite sides of the press, such as along the side rails 13, so as to engage and effect sequential shifting of individual plates 14 leftwardly along the rails into an open position.

The filter press 10 also mounts a conventional drip tray arrangement 21 thereon for disposition below the closed stack to collect liquid which leaks between the plates 14 of the stack. This drip tray arrangement includes a pair of enlarged drip trays 22 and 23 which are respectively disposed adjacent and extend longitudinally along opposite sides of the filter press. The drip trays 22 and 23 are supported on the frame of the press by suitable tray support means. In particular, the drip trays 22 and 23 have suitable brackets on the underside thereof which are fixed respectively to horizontally elongate and generally parallel hinge or support shafts 24 and 25 so as to support the drip trays 22 and 23. These hinge shafts 24 and 25 extend horizontally and longitudinally along opposite sides of the filter press and are suitable rotatably supported, as by means of bearings 26 which mounts on the frame of the press. The drip trays 22 and 23 each define a generally horizontally enlarged plate-like liquid collecting member when in the closed position, with the one drip tray 22 projecting sidewardly inwardly beneath the stack by a distance which is roughly about or slightly greater than one-half the horizontal width of the stack so as to terminate in an inner free edge 27. The other drip tray 23 similarly projects horizontally sidewardly under the stack by a distance which is also about or slightly greater than one-half of the sideward width of the stack so as to terminate in a free edge 28. The drip trays have a suitable width such that the inner free edge portions partially horizontally overlap so as to not leave any horizontal gap therebetween.

When in the closed position, the drip trays both extend dominally horizontally but have a slight sideward slope, with the drip tray 22 having a slight downward slope as it projects inwardly toward the free edge 27, and the other drip tray 23 has a similar slight downward slope as it projects outwardly away from its free edge 28. In this manner, any liquid which falls onto the tray 22 then flows inwardly and off the edge 27 onto the tray 23, and the liquids on the tray 23 then flow outward therealong and collect in a channel-like trough 29 which is formed adjacent the outer free edge of the drip tray 23. This trough 29 is disposed outwardly from the respective hinge shaft 25, and typically longitudinally slopes so as to permit the collected liquid to flow longitudinally therealong for disposal from one end as desired, such as to a suitable drain conduit (not shown).

The press 10 includes an activating mechanism 31 which effects the desired movement of the drip trays 22–23 between the closed position illustrated by solid lines in FIGS. 1 and 2, and the open position indicated by dotted lines in FIGS. 1 and 2. In the open position the trays are individually suspended generally vertically downwardly and are angularly displaced approximately 90° from the closed position. While FIGS. 1 and 2 illustrate in solid lines the drip trays in the closed position, this is solely for convenience and illustration since it will be recognized that the trays will typically be open when the stack is being opened so as to dump the solids, as depicted by FIG. 1.

The activating mechanism 31 includes a connecting or synchronizing linkage or mechanism which interconnects the hinge shafts 24 and 25 so as to always insure that the drip trays 22–23 are substantially simultaneously and synchronously moved in opposite rotational directions. This connecting linkage includes cranks or arms 32 and 33 which are non-rotatably fixed to and project radially from the respective hinge shafts 24 and 25, and these cranks 32 and 33 are in turn hingedly connected through an elongate connecting link 34 which extends transversely across the press. The cranks 32 and 33 generally project radially from the respective hinge shaft on substantially diametrically opposite sides thereof. Hence, when one of the cranks 32–33 rotates in one direction, the connecting link 34 acting on the other crank 32–33 causes a corresponding and generally synchronous rotation of the other crank in an opposite rotational direction.

The activating mechanism 31 for the drip tray arrangement also includes a pressure cylinder 35, typically a hydraulic cylinder, which has one end of the cylinder housing joined, typically hinged, to a stationary bracket 36 fixed relative to the press frame. The pressure cylinder 35 has a conventional extendable and retractable rod 37 which projects outwardly from one end of the cylinder housing, and the rod 37 adjacent the free end thereof is hingedly interconnected to a crank or arm 38 which is secured to and projects radially from one of the hinge shafts, such as the hinge shaft 24 in an arrangement illustrated by FIGS. 1 and 2.

With the prior art arrangement shown by FIGS. 1 and 2, the pressure cylinder 35 is pressurized to cause extension of the rod 37 and hence rotation of the crank 38 into the position shown in FIG. 2, and the connecting mechanism defined by the cranks 32–33 and connecting link 34 thus cause the drip trays 22 and 23 to be swingedly moved in opposite rotational directions upwardly into the closed position illustrated by FIG. 2. In this closed position of the drip trays, however, the pressure cylinder 35 must be continuously pressurized to hold the drip trays in the closed position. If the extending pressure is removed from the cylinder 35, such as due to leakage, then the weight of the drip trays tends to cause corresponding rotation of the respective hinge shafts 24 and 25 and this in turn causes a corresponding clockwise rotation of crank 38 which tends to contract the pressure cylinder 35, this being permissible due to the loss of extending pressure in the cylinder. This hence enables the individual drip trays 22 and 23 to swing downwardly away from their closed position and hence can result in loss of liquid collecting thereon since such liquid can then flow over the free edges 27 and 28 and be deposited directly onto the floor below the press.

The overall filter press 10 and the structure and operation thereof as briefly summarized above is conventional.

Figure 4:
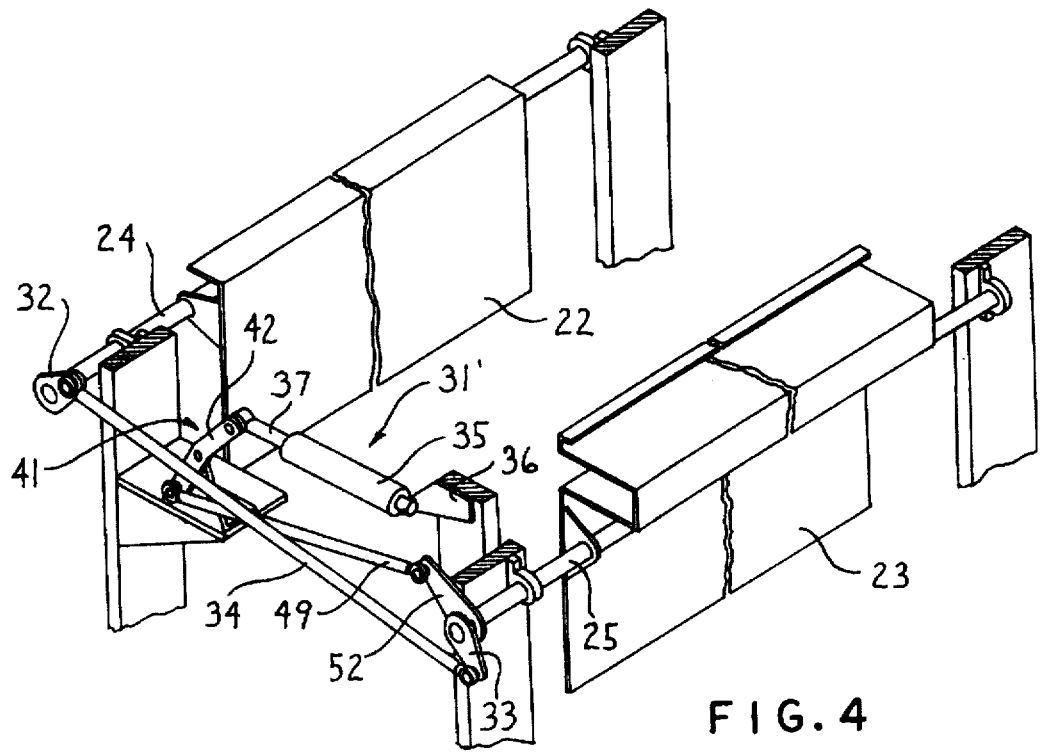

Referring now to FIGS. 3–6, there is illustrated an improved activating mechanism 31' so as to result in the drip trays 22–23 being effectively locked or stationarily held in their closed positions so as to prevent accidental release thereof due to pressure loss or release in the activating cylinder 35. Corresponding parts of the activating mechanism 31' are identified by the same reference numerals utilized above for convenience in the following description.

The activating mechanism 31' again includes the same connecting or synchronizing linkage or mechanism defined by the cranks 32–33 and the intermediate connecting link 34 so as to insure substantially simultaneous and synchronous rotation of the drip trays 22–23 in opposite rotational directions as these trays are moved between open and closed positions. To effect the opening and closing of the drip trays, the activating mechanism 31 also includes the fluid pressure cylinder 35 (typically a hydraulic cylinder) whose cylinder housing is typically connected, as by a hinge, to a bracket 36. The pressure cylinder 35 also has the conventional extendable rod 37 associated with the other end of the cylinder, which rod 37 in the present invention interconnects to a locking linkage 41 which in turn interconnects to one of the hinge shafts, this being the hinge shaft 25 in the illustrated embodiment.

The locking linkage or mechanism 41 is an over-center linkage that includes an intermediate lever or rocker 42 which is of a generally L or V shaped construction similar to a bell crank. The intermediate rocker 42 is provided with a pivot 43 at the apex thereof, which pivot 43 is supported on a suitable stationary bracket 44 and defines linkage support means for the locking mechanism 41. The pivot 43 defines a generally horizontal hinge axis which extends in the longitudinal direction of the press. The intermediate rocker 42 has a first arm 45 projecting outwardly from the pivot 43, which arm 45 adjacent its outer end has a horizontal pivot 46 which connects to the free end of the pressure cylinder rod 37. The intermediate rocker 42 has a second arm 47 which projects radially outwardly from the pivot 43, and this arm 47 at its outer end has a horizontal pivot 48 which connects to one end of an elongate connecting link 49. This elongate connecting link 49 extends transversely of the press and at its other end is connected by a pivot 51 to an outer end of a drive member, and in particular, a crank or arm 52 which is fixed to and projects radially outwardly of the hinge shaft 25. The hinges or pivots 43, 46, 48 and 51 are all substantially parallel to one another.

As most clearly illustrated in FIGS. 5 and 6 which respectively illustrate the drip trays in the closed and open positions, the pressure cylinder 35 is effectively contracted in the open position of FIG. 6 and the drip trays 22 and 23 are generally vertically downwardly suspended about the respective hinge shafts, and the weight of the drip trays and the force movements created thereby about the hinge shafts are transmitted to and through the crank 52 and the connecting link 49 so that the cylinder 35 is effectively contracted and the drip trays are thus maintained in the suspended position, this being a general neutral position wherein the movements throughout the linkage or mechanism are substantially balanced.

However, when the drip trays are to be moved into the closed position illustrated by FIG. 5, the pressure cylinder 35 is energized to effect extension of the rod 37 which in turn causes a counterclockwise rotation of the rocker 42 about the hinge 43. This in turn causes the connecting link 49 to cause a clockwise driving rotation of the crank 52 from the FIG. 6 position to the FIG. 5 position, and this in turn causes a clockwise rotation of shaft 25 and of the drip tray 23 into the closed position. The intermediate connecting link 34 also is driven by crank 33 and acts against crank 32 to cause a counterclockwise rotation of shaft 24 so that the other drip tray 22 is simultaneously swung up into its closed position. As the activating mechanism 31 and the drip trays 22–23 swing upwardly and approach the closed position shown by FIG. 5, however, the counterclockwise rotation of the rocker 42 causes the pivot 48 to be vertically moved upwardly through and ultimately above a straight line 53 which passes through the axes of the pivots 43 and 51 with the rocker arm 47 ultimately abutting a fixed stop 54 which defines the closed position for the drip trays, in which position the pivot 48 is now disposed above the line 53.

If the extending pressure to the cylinder 35 is relieved when the trays are in the closed position, then the force movement of the drip tray 22 tends to cause a clockwise movement about the hinge shaft 24 which is transmitted through connecting link 34 to tend to impose a counterclockwise movement on the hinge shaft 25. The weight of the drip tray 23 also tends to impose a counterclockwise movement on the hinge shaft 25. These counterclockwise movements imposed on hinge shaft 25 are transmitted through crank 52 to the connecting link 49 which, acting on pivot 48, in turn tends to cause a counterclockwise movement of the arm 47 about the hinge 43 inasmuch as the pivot 48 is disposed above the line 53. Since arm 47, however, is abutted against the stop 54, the weight-induced movements of the drip trays 22 and 23 as transmitted through the hinge shafts and the connecting link 49 to the pivot 48 are effectively resisted by the stop 54, and thus the entire activating and tray arrangement is thus positively stationarily held (i.e. effectively locked) in the closed position, even though the extending pressure supplied to the cylinder 35 is relieved. The drip tray arrangement is thus effectively locked in the closed position and will safely remain in this position for long periods of time. In fact, the drip tray arrangement can be positively swung away from the closed position back into the open position only by reversely energizing pressure cylinder 35 to cause initial contraction thereof sufficient to cause the pivot 48 to move downwardly onto the other side (i.e., below) the straight line 53, at which time the force movements created by the weight of the drip trays themselves will now assist in swingably moving the drip trays toward the open positions.

With the improved activating mechanism as described above, the intermediate rocker 42 and specifically the pivot 48 which connects the rocker arm 47 to the connecting link 49 effectively moves through an over-center position just prior to the drip trays 22–23 reaching their closed positions, whereby the drip trays hence are unable to move away from the closed position without requiring deliberate pressurization of the activating cylinder 35 so as to effect contraction of the cylinder and hence movement of the pivot 48 back through the over-center position.

While the arrangement as described above illustrates the cylinder 35 as being extended during the closing movement and contracted during the opening movement, it will be appreciated that these could be reversed merely by repositioning the pressure cylinder relative to the intermediate rocker 42 so that the pressure cylinder would require contraction during the closing movement of the drip trays and extension during the opening movement thereof.

In addition, while the fixed stop 54 is shown as cooperating directly with the rocker 42, it will be appreciated that the stop could be positioned for cooperation with some other part of the linkage. For example, the stop pin 54 could be positioned for cooperation with the other rocker arms 45, such as indicated by dotted lines at 54'. Alternately, the stop could be incorporated directly into the pressure cylinder to provide a defined maximum extension and/or contraction point.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a plate-type filter press having an elongate frame which defines a base of the filter press and is horizontally elongate so as to define a horizontal longitudinal axis thereof, a first press head mounted on said frame adjacent one end thereof, a second press head movably mounted on said frame adjacent the other end thereof, a plurality of vertically-enlarged filter plates slidably supported on said frame between said first and second press heads, drive means for moving said second press head longitudinally along said frame between a first closed position wherein the plurality of filter plates are snugly horizontally stacked between the press heads and an open position wherein the second press head is horizontally spaced sufficiently from the first press head to permit slidable displacement of the individual filter plates longitudinally along the frame, a drip tray arrangement movably mounted on the frame and when in a closed position extending generally under the stack of plates for collecting liquid which leaks from the stack, the drip tray arrangement including first and second drip trays and respective first and second tray support means for supporting said first and second drip trays on said frame downwardly below said filter plates for swinging movement of said first and second drip trays respectively about first and second horizontally elongate hinge axes which are disposed in the vicinity of opposite sides of the filter press and extend longitudinally thereof, wherein said first and second drip trays project away from said respective first and second hinge axes and terminate at respective free edges, said free edges of the first and second drip trays being suspended generally downwardly adjacent opposite sides of the filter press generally from the respective first and second hinge axes when in an open position, said free edges of said first and second drip trays being vertically swung upwardly in opposite rotational directions about their respective hinge axes generally towards one another into a closed position wherein the first and second drip trays project generally horizontally inwardly toward one another for disposition below the stack of plates, and an activating mechanism for substantially corresponding and synchronized movement of the first and second drip trays between said open and closed positions, said activating mechanism including a drive member non-rotatably fixed relative to said first drip tray so as to rotate therewith about said first hinge axis, said activating mechanism also including a synchronizing mechanism connected between said first and second drip trays so as to cause substantially corresponding and synchronized rotation thereof in opposite rotational directions, and a fluid pressure cylinder mechanism including an extendable and contractible fluid pressure cylinder interconnected to said drive member for controlling synchronous rotation of said first and second drip trays, the improvement comprising a locking mechanism separate from said synchronizing mechanism and interconnected to a movable end section of said fluid pressure cylinder and to said drive member radially outwardly of said first hinge axis to effect driving movement of said first and second drip trays by said fluid pressure cylinder downwardly to said open position and upwardly to said closed position and, to effect self-locking of the activating mechanism and of the drip trays in the closed position even if the pressure cylinder is de-pressurized.

2. A filter press according to claim 1, wherein the locking mechanism includes an over-center linkage which includes linkage support means for connecting said over-center linkage to said filter press so that said over-center linkage is movable in first and second directions between first and second positions and through an over-center position disposed therebetween during movement of said first and second drip trays, said over-center linkage being connected between said movable end section of said pressure cylinder and said drive member radially outwardly of said first hinge axis so that weight-generated forces of said first and second drip trays act on said over-center linkage in said first direction when in said first position and in said second direction when in said second position, said over-center linkage moving in said second direction into and through said over-center position just prior to said drip trays being swingably moved into said closed position such that the action of said forces changes between said first and second directions, and stop means which stops movement of said over-center linkage in said second direction for defining said closed position and preventing said linkage from moving in said second direction away from said first position so that said drip trays are locked in said closed position due to said forces created by the drip trays.

3. A filter press according to claim 1, wherein said locking mechanism is connected intermediate said fluid pressure cylinder and said drive member, one end of said fluid pressure cylinder being connected to said frame and said movable end section being movable relative to said one end during extension and contraction thereof and being connected to said locking mechanism so that driving forces of said cylinder are transmitted thereto, said locking mechanism being interconnected to said first drip tray so that said driving forces are transmitted thereto.

4. A filter press according to claim 1, wherein said locking mechanism includes an over-center linkage which includes a rocker mechanism, said rocker mechanism having linkage support means which defines a first hinge for horizontally hingedly supporting the rocker mechanism on the frame, the rocker mechanism including a first arm which projects radially from the first hinge and terminates in a second hinge which is spaced radially from said first hinge and connects to said movable end section of the pressure cylinder, the rocker mechanism including a second arm which projects radially from the first hinge and terminates in a third hinge which is pivotally connected to one end of an elongate connecting link, said third hinge being circumferentially spaced from said second hinge, and said elongate connecting link at the other end thereof being joined by a fourth hinge to said drive member that projects radially outwardly from said first hinge axis, said force of said first drip tray being transmitted to said second arm through said elongate connecting link.

5. In a plate-type filter press having an elongate frame which defines a base of the filter press and is horizontally elongate so as to define a horizontal longitudinal axis thereof, a first press head mounted on said frame adjacent one end thereof, a second press head movably mounted on said frame adjacent the other end thereof, a plurality of vertically-enlarged filter plates slidably supported on said frame between said first and second press heads, drive means for moving said second press head longitudinally along said frame between a first closed position wherein the plurality of filter plates are snugly horizontally stacked between the press heads and an open position wherein the second press head is horizontally spaced sufficiently from the first press head to permit slidable displacement of the individual filter plates longitudinally along the frame, a drip tray arrangement movably mounted on the frame and when in a closed position extending generally under the stack of plates for collecting liquid which leaks from the stack, the drip tray arrangement including first and second drip trays and respective first and second tray support means for supporting said first and second drip trays on said frame downwardly below said filter plates for swinging movement of said first and second drip trays respectively about first and second horizontally elongate hinge axes which are disposed in the vicinity of opposite sides of the filter press and extend longitudinally thereof, wherein said first and second drip trays project away from said respective first and second hinge axes and terminate at respective free edges, said free edges of the first and second drip trays being suspended generally downwardly adjacent opposite sides of the filter press generally from the respective first and second hinge axes when in an open position, said free edges of said first and second drip trays being vertically swung upwardly in opposite rotational directions about their respective hinge axes generally towards one another into a closed position wherein the first and second drip trays project generally horizontally inwardly toward one another for disposition below the stack of plates, and an activating mechanism for substantially corresponding and synchronized movement of the first and second drip trays between said open and closed positions, said activating mechanism including a crank arm which is non-rotatably fixed relative to said first drip tray so as to rotate therewith and project radially outwardly from said first hinge axis, said activating mechanism including a synchronizing mechanism connected to said first and second drip trays between said first and second hinge axes so as to cause substantially corresponding and synchronized rotation of said first and second drip trays in opposite rotational directions, and a fluid pressure cylinder mechanism including an extendable and contractible fluid pressure cylinder interconnected to said crank arm for controlling rotation of said first and second drip trays, the improvement comprising a locking mechanism separate from said synchronizing mechanism and interconnected to said fluid pressure cylinder to effect self-locking of the activating mechanism and of the drip trays in the closed position even if the pressure cylinder is depressurized, said locking mechanism including an over-center linkage having a bell crank and linkage support means for movably connecting said bell crank to said frame so as to be movable in first and second directions through an over-center position, said drip trays creating weight-generated forces which are transmitted to said bell crank by an elongate connecting link having first and second ends connected respectively to said crank arm and said bell crank, said over-center position defining the position at which said forces change between acting in said first direction and acting in said second direction, said locking mechanism further including stop means which stops movement of said bell crank in said second direction for defining said closed position and preventing said bell crank from moving in said second direction away from said closed position due to said forces, the bell crank having said linkage support means which defines a first hinge which horizontally hingedly supports the bell crank on the frame, the bell crank including a first arm which projects radially from the first hinge and terminates in a second hinge which is spaced radially from said first hinge and connects to a movable end of the pressure cylinder, the bell crank including a second arm which projects radially from the first hinge and terminates in a third hinge which is pivotally connected to said second end of said elongate connecting link, said third hinge being circumferentially spaced from said second hinge, and said elongate connecting link at the first end thereof being joined by a fourth hinge to said crank arm radially outwardly away from said first hinge axis.

6. A filter press according to claim 5, wherein said third hinge moves vertically upwardly when the drip trays are moved from the open position to the closed position, and said third hinge moving from a position below and thence upwardly through and into a position above a straight line which extends between said first and fourth hinges when said drip trays are moved toward and closely approach said closed position.

* * * * *